(12) United States Patent
Yang et al.

(10) Patent No.: US 8,615,278 B2
(45) Date of Patent: Dec. 24, 2013

(54) ELECTRICAL DEVICE WITH ROTATION MECHANISM

(75) Inventors: Xin Yang, Shenzhen (CN); Wei Wu, Shenzhen (CN)

(73) Assignees: Fu Tai Hua Industry (Shenzhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 140 days.

(21) Appl. No.: 13/217,270

(22) Filed: Aug. 25, 2011

(65) Prior Publication Data

US 2012/0049710 A1 Mar. 1, 2012

(30) Foreign Application Priority Data

Aug. 27, 2010 (CN) .......................... 2010 1 0264770

(51) Int. Cl.
*H04M 1/00* (2006.01)

(52) U.S. Cl.
USPC ...................... 455/575.3; 312/326; 361/679.3

(58) Field of Classification Search
None
See application file for complete search history.

(56) References Cited

U.S. PATENT DOCUMENTS

| | | | | |
|---|---|---|---|---|
| 4,719,700 A | * | 1/1988 | Taylor, Jr. ........................ | 30/158 |
| 2005/0081302 A1 | * | 4/2005 | Elsener ............................ | 7/118 |
| 2006/0223596 A1 | * | 10/2006 | Hur ............................ | 455/575.4 |

* cited by examiner

*Primary Examiner* — German J Viana Di Prisco
(74) *Attorney, Agent, or Firm* — Altis Law Group, Inc.

(57) ABSTRACT

An exemplary electrical device includes a first main body, a second main body and a rotation mechanism interconnecting the first main body and the second main body. The first main body is rotatable relative to the second main body. The rotation mechanism includes a holding portion configured to have an external force applied thereon by a user so as to be driven to linearly move from a first position to a second position, and the rotation mechanism is structured and arranged to convert the linear movement to rotational movement of the first main body relative to the second main body.

16 Claims, 7 Drawing Sheets

ELECTRICAL DEVICE WITH ROTATION MECHANISM

BACKGROUND OF THE DISCLOSURE

1. Field of the Disclosure

The present disclosure generally relates to electrical devices, and particularly to an electrical device having two hinged parts.

2. Description of Related Art

Many electrical devices include two main bodies that are movably attached to each other, whereby the electrical device can be safely stored in a closed (or folded) state, and used in an open (or unfolded) state. Generally, in a foldable or slidable electrical device such as a mobile phone, a user must slide and/or rotate the two main bodies relative to each other to change the device from the closed/folded state to the open/unfolded state. This can be inconvenient because the amount of force that needs to be applied may be uncomfortable for the user.

What is needed, therefore, is an electrical device which can overcome the described limitations.

BRIEF DESCRIPTION OF THE DRAWINGS

The components in the drawings are not necessarily drawn to scale, the emphasis instead being placed upon clearly illustrating the principles of the present disclosure. Moreover, in the drawings, like reference numerals designate corresponding parts throughout the several views, and all the views are schematic.

DESCRIPTION OF EMBODIMENTS

Reference will be made to the drawings to describe preferred and exemplary embodiments in detail.

Figure 1:
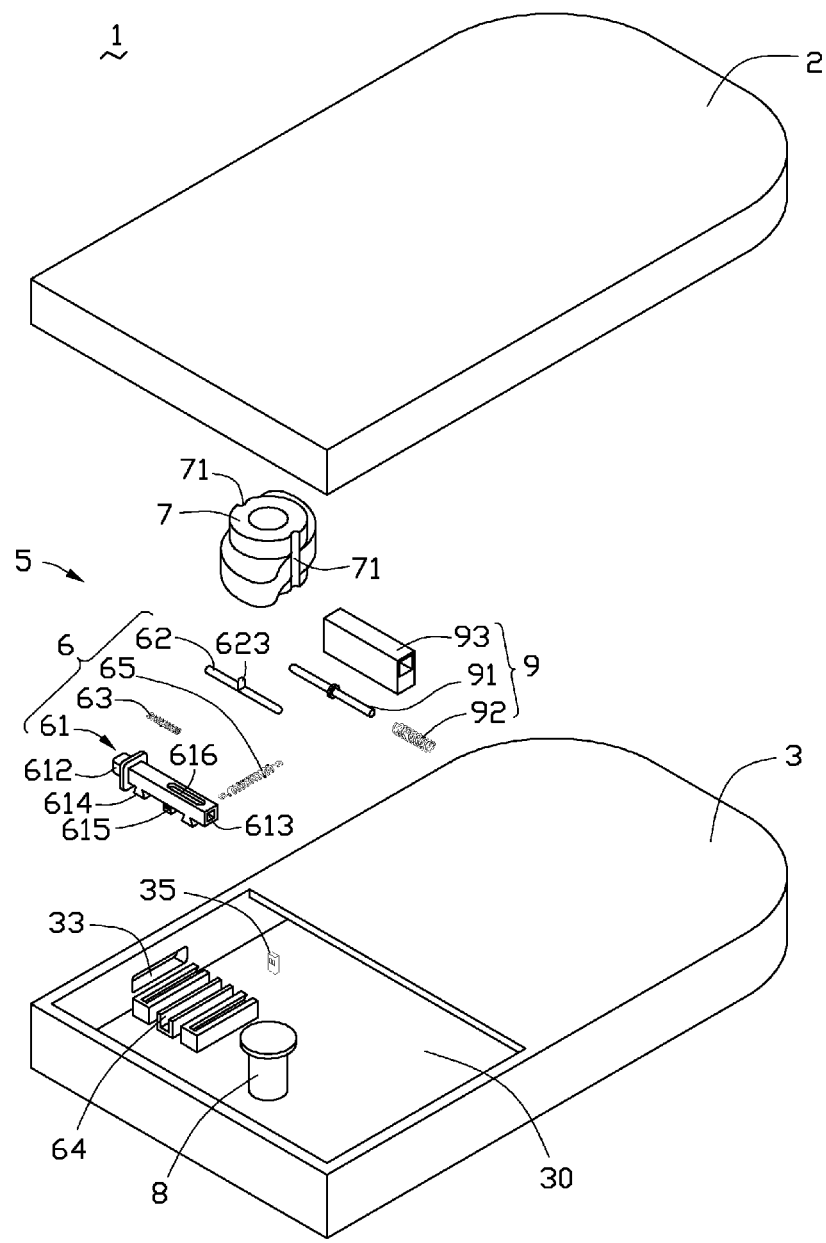
FIG. 1 is an exploded, isometric view of an electrical device according to an exemplary embodiment of the present disclosure.

Referring to FIG. 1, an electrical device 1 according to an exemplary embodiment of the present disclosure is shown. The electrical device 1 includes a first main body 2, a second main body 3, and a rotation mechanism 5 connecting the first main body 2 to the second main body 3. The first main body 2 is thus rotatable relative to the second main body 3. Thereby, in general terms, the electrical device 1 can be adjusted to be in a folded (closed) state or an unfolded (open) state. When the electrical device 1 is in the folded state, the first main body 2 fully covers the second main body 3. When the electrical device 1 is in the unfolded state, the first main body 2 and the second main body 3 merely overlap, such that the second main body 3 is exposed from the first main body 2 and operable by a user. The electrical device 1 may for example be a mobile phone, in which case the first main body 2 and the second main body 3 may respectively be a display module and a base body of the mobile phone.

The second main body 3 includes a housing 30. The rotation mechanism 5 includes a driving element 6, a driven element 7, a spindle 8, and a limiting element 9. The driving element 6, the spindle 8, and the limiting element 9 are disposed in the housing 30 of the second main body 3, and the driving element 6 and the limiting element 9 are located at two opposite sides of the spindle 8 respectively. The driven element 7 is fixed to the first main body 2 and rotatable together with the first main body 2. The driven element 7 is rotatably attached to the second main body 3 by the spindle 8 and the driving element 6.

The driving element 6 includes an adjusting post 61, a driving post 62, a first elastic member 63, a plurality of rails 64, and a second elastic member 65. The rails 64 may be fastened to an inner surface (not labeled) of the housing 30. The rails 64 define two opposite moving directions of the adjusting post 61. Each of the rails 64 defines a first groove therein.

The adjusting post 61 is configured to move back or forth along the rails 64, according to operation of the electrical device 1 by a user. The adjusting post 61 forms a holding portion 612 at one end thereof, and the holding portion 612 extends out of the second main body 3 from a first slot 33 defined in a side wall (not labeled) of the housing 30. The first slot 33 is configured to allow the holding portion 612 to move in the first slot 33 along opposite directions corresponding to the directions of movement of the adjusting post 61 along the rails 64. The adjusting post 61 is hollow, and defines an axial first hole 613 at another end which is opposite to the end having the holding portion 612. At least one protrusion 614 and a contacting member 615 are disposed on a surface of the adjusting post 61 which corresponds to the rails 64. In this embodiment, there are two protrusions 614, and the contacting member 615 is located between the two protrusions 614. Correspondingly, there are three rails 64. The protrusions 614 and the contacting member 615 are respectively inserted into the first grooves of the rails 64 and movable along the moving directions defined by the rails 64. A second slot 616 is defined in another surface of the adjusting post 61 which is opposite to surface having the protrusions 614. The second slot 616 communicates with the first hole 613.

The driving post 62 includes a limiting protrusion 623. The driving post 62 is received in the first hole 613 of the adjusting post 61, with the limiting protrusion 623 being limited in the second slot 616, and with an end of the driving post protruding out of the first hole 613.

The first elastic member 63 is also received in the first hole 613 of the adjusting post 61. One end of the first elastic member 63 abuts against an inmost end surface of the first hole 613 in the adjusting post 61, and the other end of the first elastic member 63 abuts against an end of the driving post 62, so that the first elastic member 63 is capable of exerting a resilient force on the driving post 62 when compressed or stretched.

The second elastic member 65 is configured to exert a resilient force on the adjusting post 61 when the adjusting post 61 moves away from an initial position of the adjusting post 61, so as to return the adjusting post 61 to the initial position. One end of the second elastic member 65 is connected to the contacting member 615 of the adjusting post 61, and the other end of the second elastic member 65 is connected to a fixing member 35 of the second main body 3. Resilient force exerted by the second elastic member 65 is substantially perpendicular to resilient force exerted by the first elastic member 63.

Figure 4:
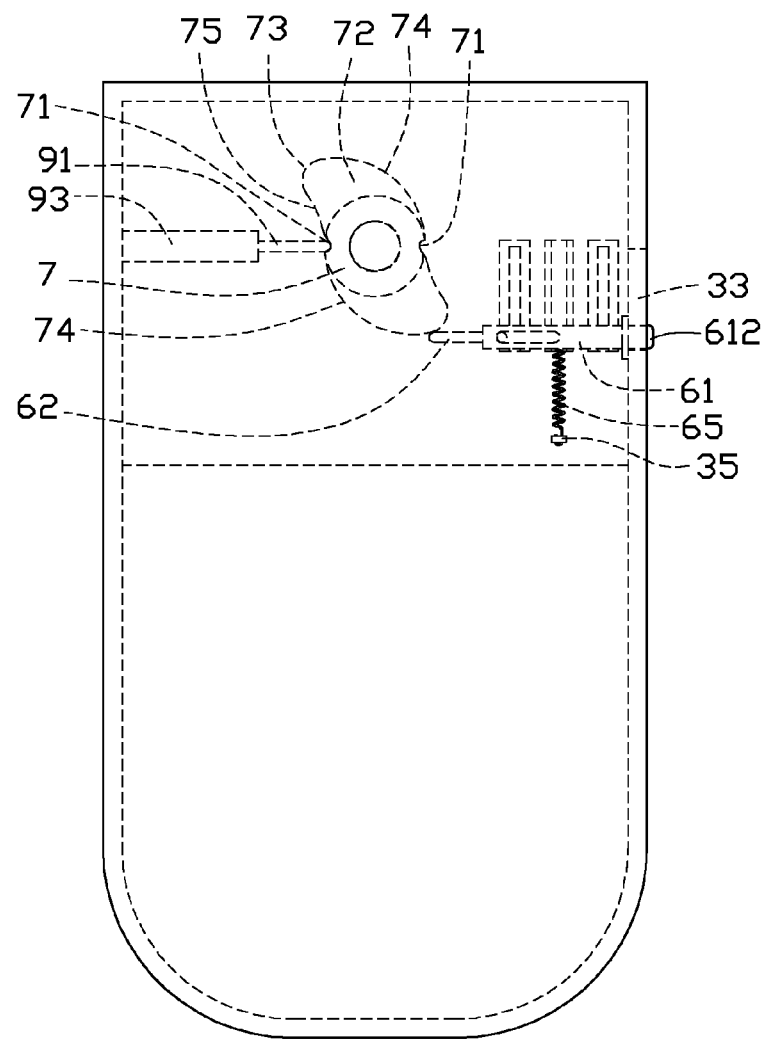
FIG. 4 is a top plan view of the electrical device of FIG. 3.

Also referring to FIG. 4, the driven element 7 defines a rotation axis. The driven element 7 may include a central body (not labeled), and two cam portions 72 disposed at two opposite sides of the central body, respectively. A through hole is axially defined in the central body, and is adapted to receive the spindle 8 therein. The two cam portions 72 are rotationally symmetric about an axis of the central body (which axis coincides with the rotation axis). Each cam portion 72 has a substantially curved profile. Each cam portion 72 includes a driving surface 74, and a resistant surface 75. The driving surface 74 is a convex surface, and the resistant surface 75 is a concave surface. A curvature of the driving surface 74 is greater than that of the resistant surface 75. For each cam portion 72, contact surfaces of the driving surface 74 and the resistant surface 75 are together defined as a dynamic area 73. Intersections where the driving surface 74 of one cam portion 72 meets the resistant surface 75 of the other cam portion 72 are defined as static areas 71.

The limiting element 9 includes a body 93, a limiting post 91, and a third elastic member 92. The body 93 is fixed to the housing 30 and located at a side wall of the housing 30 opposite to the side wall having the first slot 33. The body 93 is hollow, and defines an axial second hole (not labeled) at an end thereof facing the driven element 7. The limiting post 91 is received in the second hole. The third elastic member 92 is also received in the second hole. One end of the third elastic member 92 abuts against an inmost end surface of the second hole inside the limiting element 9, and the other end of the third elastic member 92 abuts against an end of the limiting post 91, so that the third elastic member 92 is capable of exerting a resilient force on the limiting post 91 when compressed or stretched.

Figure 2:
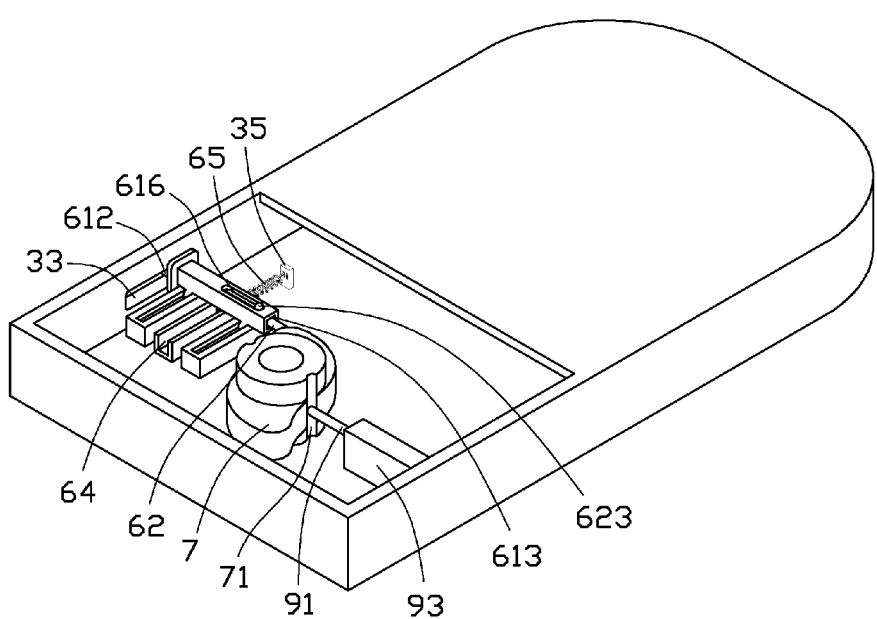
FIG. 2 is an assembled view of the electrical device of FIG. 1, but omitting a first main body thereof.

Referring also to FIG. 2 again, in assembly, first, the driving element 6 is assembled in the housing 30 of the second main body 3. The first elastic member 63 and the driving post 62 are received in the first hole 613 of the adjusting post 61. The two protrusions 614 and the contacting member 615 are respectively inserted into the first grooves of the rails 64, and the holding portion 612 of the adjusting post 61 extends through the first slot 33. The two ends of the second elastic member 65 are respectively connected to the contacting member 615 and the fixing member 35.

Second, the limiting element 9 is assembled in the housing 30 of the second main body 3. The third elastic member 92 and the limiting post 91 are received in the second hole of the body 93. The limiting element 9 is fixed in the housing 30 at the side wall of the housing 30 opposite to the side wall having the first slot 33.

Figure 3:
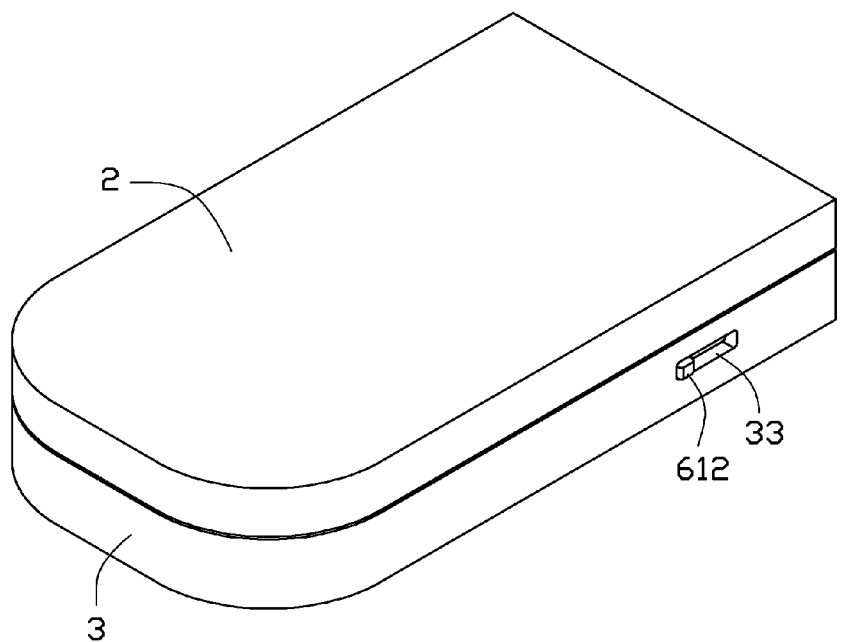
FIG. 3 is an assembled view of the electrical device of FIG. 1, wherein the electrical device is in a folded state.

Finally, the first main body 2 is assembled on the second main body 3. In detail, the driven element 7 is fixed on the first main body 2, and fitted around the spindle 8. The driving post 62 and the limiting post 91 respectively abut against the driven element 7. The limiting post 91 is aligned with the center of the driven element 7. Thus the electrical device 1 is assembled, as shown in FIG. 3.

When the electrical device 1 is in an initial state (i.e. the folded or closed state), the limiting post 91 abuts against one of the static areas 71 of the driven element 7, the adjusting post 61 is located at the initial position in which the second elastic member 65 has a smallest resilient force, the holding portion 612 is located at an end of the first slot 33 (in a "first position"), and the driving post 62 abuts against the driving surface 74 of one of the two cam portions 72.

Figure 5:
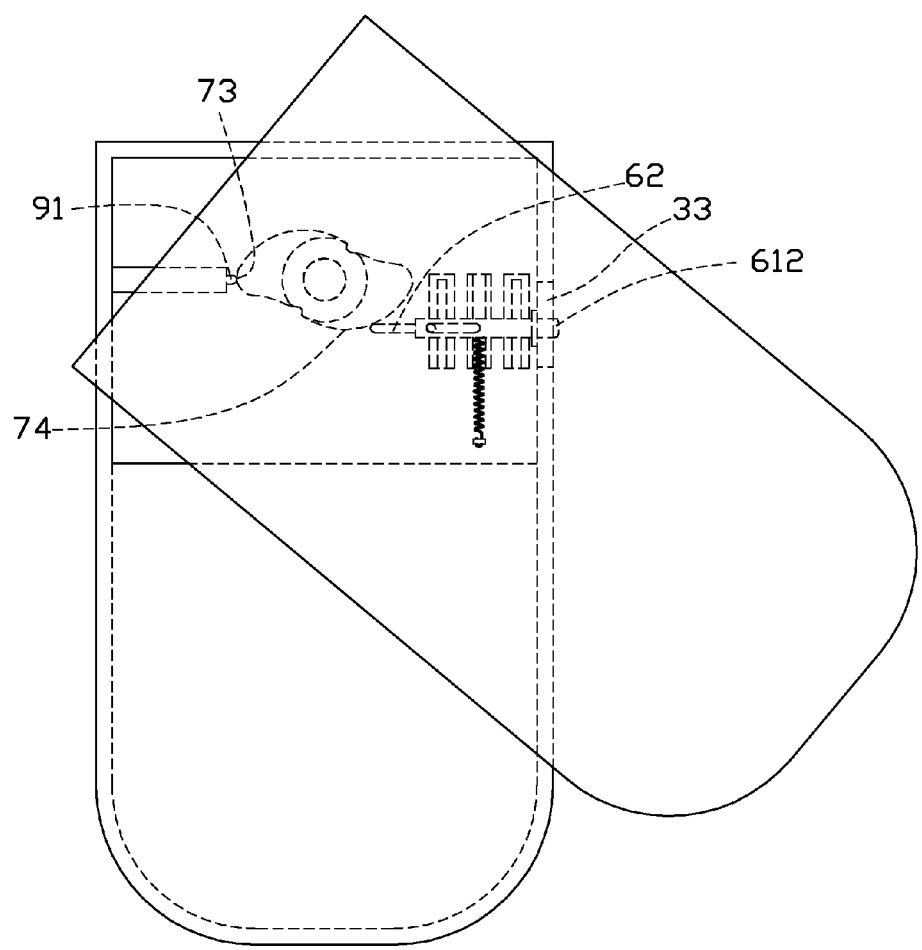
FIGS. 5-7 are similar to FIG. 4, but showing the electrical device in various unfolded (open) states.

To switch the electrical device 1 from the folded state to the unfolded state, a user applies an external force to the holding portion 612 of the adjusting post 61 to drive the adjusting post 61 to move along a forward direction. Because the driving post 62 abuts against the driving surface 74 of one of the two cam portions 72, when the driving post 62 follows the adjusting post 61 and moves forward, the driving post 62 drives the driven member 7 to rotate counterclockwise. The resistant surface 75 of the other one of the two cam portions 72 gradually rides along an end of the limiting post 91, and the contact point between the resistant surface 75 of the other one of the two cam portions 72 and the limiting post 91 gradually moves from the static area 71 toward the dynamic area 73 of the other one of the two cam portions 72. As a result, the other one of the two cam portions 72 exerts a force on the limiting post 91 to make the limiting post 91 retract into the second hole of the body 93 of the limiting element 9. Referring also to FIG. 5, when the contact point between the resistant surface 75 of the other one of the two cam portions 72 and the limiting post 91 reaches the beginning of the dynamic area 73, the third elastic member 92 is compressed to have a minimum length. A resilient force exerted by the third elastic member 92 is at a maximum, and the resilient force exerted by the third elastic member 92 is applied to the end of the limiting post 91. At this position, the holding portion 612 of the adjusting post 61 is located at approximately a center of the first slot 33.

Figure 6:
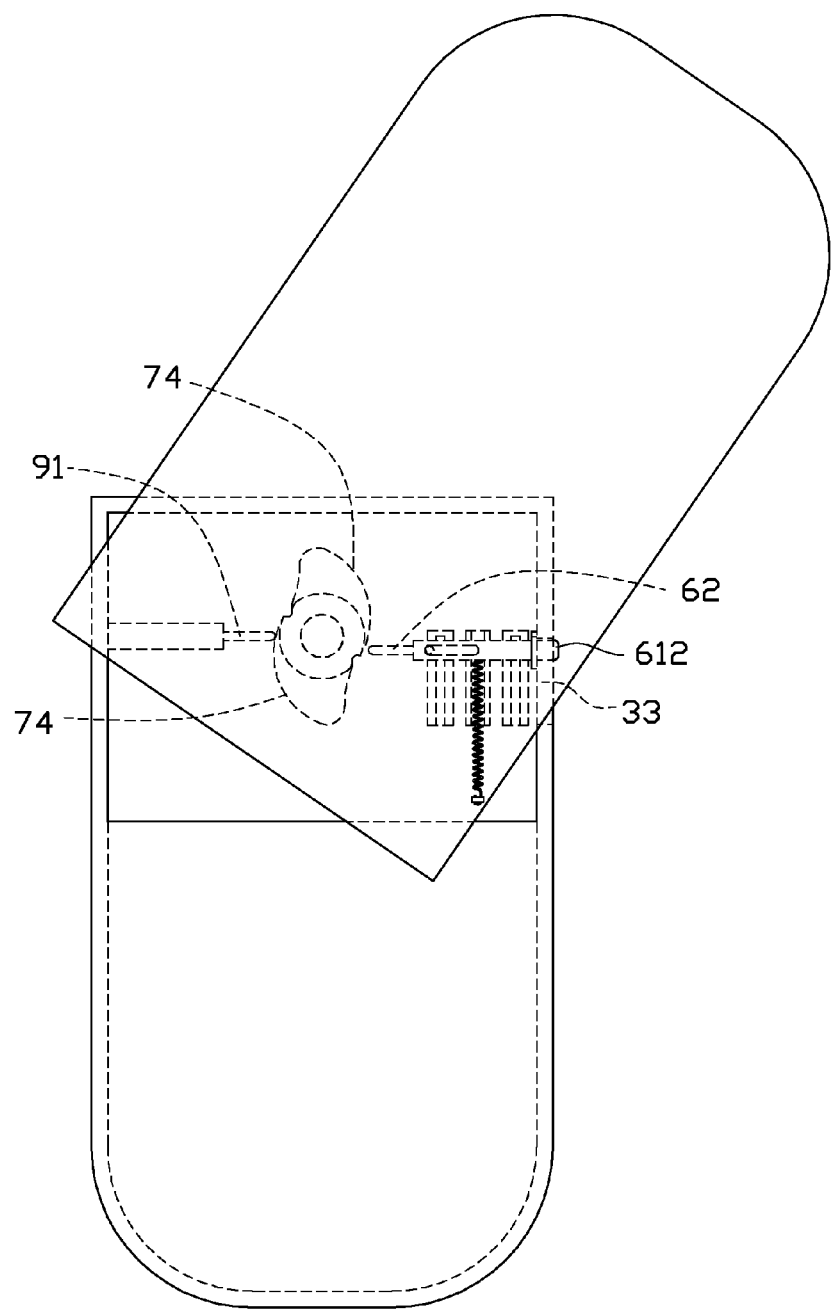

When the adjusting post 61 continues to be driven along the forward direction, the driving post 62 still abuts against the driving surface 74 of the one of the two cam portions 72, and the contact point between the driving surface 74 and the driving post 62 gradually moves along the driving surface 74. Thus the driven member 7 continues to rotate counterclockwise. Simultaneously, the contact point between the other one of the two cam portions 72 and the limiting post 91 moves to the driving surface 74 of the other one of the two cam portions 72. The third elastic member 92 decompresses during such movement, urging the limiting post 91 against the driving surface 74 of the other one of the two cam portions 72 and thus facilitating the counterclockwise rotation of the driven member 7. In this way, the holding portion 612 of the adjusting post 61 reaches another end of the first slot 33 (a "second position") and stops moving forward, and the driven member 7 reaches the position shown in FIG. 6. As seen in FIG. 6, the adjusting post 61 is located farthest away from the fixing member 35, and the second elastic member 65 is extended to have a maximum length.

Figure 7:
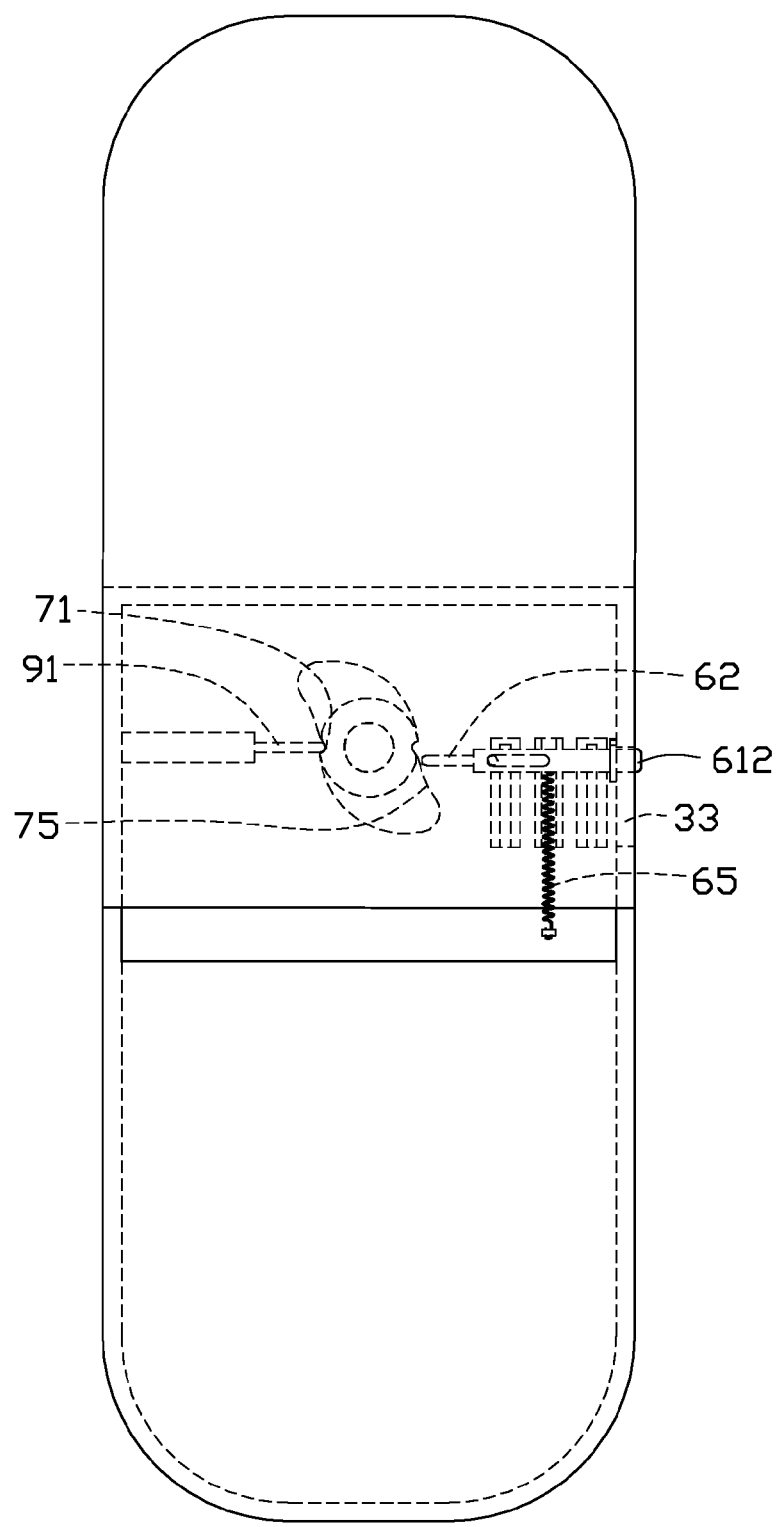

In the position shown in FIG. 6, the limiting post 91 still abuts against the driving surface 74 of the other one of the two cam portions 72. The third elastic member 92 continues to decompress and urge the limiting post 91, such that the limiting post 91 continues to drive the driven element 7 to rotate counterclockwise until the limiting post 91 and the driving post 62 respectively reach the two static areas 71 of the driven element 7, as shown in FIG. 7. As seen in FIG. 7, the driving post 62 and the limiting post 91 are almost aligned with each other, and the electrical device 1 is completely unfolded.

During the above-described processes, the first main body 2 rotates counterclockwise in unison with the driven element 7. Thus when the holding portion 612 is slid along the first slot 33, the first main body 2 is rotated counterclockwise and exposes the second main body 3, and the unfolded electrical device 1 is ready for use.

When the external force on the holding portion 612 of the adjusting post 61 is released, the stretched second elastic member 65 exerts resilient force on the adjusting post 61 to make the adjusting post 61 move backward along the rails 64 and return to the initial position shown in FIG. 4. Simultaneously, the holding portion 612 moves backward together with the adjusting post 61 and returns to the first position.

During the process of the adjusting post 61 returning to the initial position, the driving post 62 rides along the resistant surface 71 of the other one of the two cam portions 72, and the limiting post 91 rides along the driving surface 74 of the other one of the two cam portions 72. That is, both the driving post 62 and the limiting post 91 ride along the same cam portion 72 of the driven element 7. Therefore during the process of the driving post 62 returning to its initial position, the driving post 62 urges the driven element 7 to rotate clockwise, and simultaneously the limiting post 91 exerts resilient force on the driven element 7 and resists clockwise rotation of the driven element 7. Because the curvature of the resistant surface 71 is less than that of the driving surface 74, the driven element 7 rotates clockwise slightly and then counterclockwise slightly to allow the driving post 62 to return to its initial position. Accordingly, during the process of the adjusting post 61 returning to the initial position, the electrical device 1 remains unfolded. The limiting element 9 is used to allow the rotation mechanism 5 to rotate along a consistent direction, and prevent the rotation mechanism 5 from rotating along a reverse direction.

When the user wants to fold the electrical device 1, the user can repeat the above-described operation of pushing the holding portion 612 of the adjusting post 61 forward and thus driving the adjusting post 61 to move along the forward direction. Similar to the processes described above, the first main body 2 rotates counterclockwise in unison with the driven element 7, such that the electrical device 1 returns to the folded state. The user releases the force applied on the holding portion 612, and the holding portion 612 returns to the first position and the adjusting post 61 returns to the initial position.

The electrical device 1 may be a cellular telephone, a notebook, an electronic book, a digital picture display device, and so on.

The electrical device 1 herein is not limited to the above-described embodiments. For example, in alternative embodiments, there can be two rails 64, or four or more rails 64. In another example, the main rotating direction can be clockwise, with the limiting element 9 preventing the driven element 7 from rotating counterclockwise.

It is believed that the present embodiments and their advantages will be understood from the foregoing description, and it will be apparent that various changes may be made thereto without departing from the spirit and scope of the disclosure or sacrificing all of its material advantages, the examples hereinbefore described merely being preferred or exemplary embodiments of the disclosure.

What is claimed is:

1. An electrical device, comprising:
   a first main body;
   a second main body being rotatable relative to the first main body, and comprising a housing, the housing defining a slot; and
   a rotation mechanism received in the housing and configured to connect the first main body to the second main body;
   the rotation mechanism comprising a spindle disposed in the housing, a driving element and a driven element, the driving element fitted around the spindle and comprising a holding portion protruding out of the housing via the slot, the driving element being movable along opposite linear directions, the driven element being fastened on the first main body and being driven by the driving element when the driving element moves along one of the opposite directions from a first position to a second position, and the driven element defining a rotation axis, and comprising a central body and two cam portions, the two cam portions being rotationally symmetric about an axis of the central body, and the central body fitted around the spindle;
   wherein the electrical device is capable of being adjusted to be in a folded state or an unfolded state; and in an initial state of the electrical device, the driving element is at the first position; and when external force is applied on the holding portion to drive the driving element to move along said one of the opposite directions from the first position to the second position, the driving element drives the driven element to rotate, and the first main body rotates in unison with the driven element to switch the electrical device from one of the folded state and the unfolded state to the other one of the folded state and the unfolded state.

2. The electrical device of claim 1, wherein each cam portion comprises a driving surface and a resistant surface, and a curvature of the driving surface is greater than that of the resistant surface.

3. The electrical device of claim 2, wherein the driving surface is a convex surface, and the resistant surface is a concave surface, contact surfaces of the driving surface and the resistant surface of each cam portion are together defined as a dynamic area, and intersections where the driving surface of one cam portion meets the resistant surface of the other cam portion are defined as static areas.

4. The electrical device of claim 2, wherein the driving element comprises an adjusting post, a first elastic member and a driving post, the holding portion is formed on the adjusting post, the driving post is movable together with the adjusting post along the opposite linear directions, the first elastic member is compressed between the adjusting post and the driving post to exert a resilient force on the driving post, and the driving post thereby abuts against the driving surface of one of the two cam portions of the driven element.

5. The electrical device of claim 4, further comprising a fixing member disposed in the housing, wherein the driving element further comprises a second elastic member, with one end of the second elastic member connected to the adjusting post, and the other end of the second elastic member connected to the fixing member, and the second elastic member is configured to exert a resilient force on the adjusting post when the adjusting post moves away from the first position.

6. The electrical device of claim 5, wherein the rotation mechanism further comprises a limiting element fixed in the housing, the limiting element and the driving element are located at two opposite sides of the spindle, and the limiting element is configured for facilitating the driven element to rotate along a predetermined direction and limiting rotation of the driven element along a direction opposite to the predetermined direction.

7. The electrical device of claim 6, wherein the limiting element comprises a main body, a limiting post and a third elastic member, the main body is hollow, the limiting post and the third elastic member are received in the main body, the third elastic member is compressed between the main body and the limiting post to exert a resilient force on the limiting post, and the limiting post thereby abuts against one of the two cam portions of the driven element; when external force is applied on the holding portion to drive the driving element to move along said one of the opposite directions from the first position to the second position, the first main body rotates in unison with the driven element to switch the electrical device from one of the folded state and the unfolded state to the other one of the folded state and the unfolded state; and when the external force on the holding portion is released, the second elastic member exerts resilient force on the adjusting post to make the adjusting post move back along the other one of the opposite directions and return to the first position, and during and upon completion of the process of the adjusting post returning to the first position, the electrical device remains switched to the other one of the folded state and the unfolded state.

8. The electrical device of claim 5, further comprising a plurality of rails disposed in the housing, wherein at least one protrusion and a contacting member are disposed on a surface of the adjusting post, the at least one protrusion and the contacting member are slidable along the rails, and the one end of the second elastic member is connected to the contacting member of the adjusting post.

9. An electrical device, comprising:
a first main body;
a second main body rotatable relative to the first main body, the second main body comprising a housing, the housing defining a slot; and
a rotation mechanism interconnecting the first main body and the second main body,
the rotation mechanism comprising:
a driving element disposed in the housing;
a holding portion extending out of the housing via the slot, the holding portion formed on the driving element and being configured to linearly move in the slot from a first position to a second position when driven by an external force applied thereon, and the rotation mechanism structured and arranged to convert the linear movement of the holding portion to rotational movement of the first main body relative to the second main body;
a spindle disposed in the housing; and
a driven element rotatably mounted around the spindle and fastened to the first main body, the driven element defining a rotation axis, and comprising a central body and two cam portions, the two cam portions being rotationally symmetric about an axis of the central body, and the central body fitted around the spindle;
wherein the electrical device is capable of being adjusted to be in a folded state or an unfolded state, in an initial state of the electrical device, when the holding portion moves linearly via the external force from the first position to the second position, the driving element drives the driven element to rotate, and the first main body then rotates in unison with the driven element to switch the electrical device from one of the folded state and the unfolded state to the other one of the folded state and the unfolded state.

10. The electrical device of claim 9, wherein each cam portion comprises a driving surface and a resistant surface, and a curvature of the driving surface is greater than that of the resistant surface.

11. The electrical device of claim 10, wherein the driving surface is a convex surface, and the resistant surface is a concave surface, contact surfaces of the driving surface and the resistant surface of each cam portion are together defined as a dynamic area, and intersections where the driving surface of one cam portion meets the resistant surface of the other cam portion are defined as static areas.

12. The electrical device of claim 10, wherein the driving element comprises an adjusting post, a first elastic member and a driving post, the holding portion is formed on the adjusting post, the driving post is movable together with the adjusting post, the first elastic member is compressed between the adjusting post and the driving post to exert a resilient force on the driving post, and the driving post thereby abuts against the driving surface of one of the two cam portions of the driven element.

13. The electrical device of claim 12, further comprising a fixing member disposed in the housing, the driving element further comprises a second elastic member, with one end of the second elastic member connected to the adjusting post, and the other end of the second elastic member connected to the fixing member, and the second elastic member is configured to exert a resilient force on the adjusting post when the adjusting post moves away from the first position.

14. The electrical device of claim 13, wherein the rotation mechanism further comprises a limiting element fixed in the housing, the limiting element and the driving element are located at two opposite sides of the spindle, and the limiting element is configured for facilitating the driven element to rotate along a predetermined direction and limiting rotation of the driven element along a direction opposite to the predetermined direction.

15. The electrical device of claim 14, wherein the limiting element comprises a body, a limiting post and a third elastic member, the body is hollow, the limiting post and the third elastic member are received in the body, the third elastic member is compressed between the main body and the limiting post to exert a resilient force on the limiting post, and the limiting post thereby abuts against one of the two cam portions of the driven element; when external force is applied on the holding portion to drive the driving element to move said linearly direction from the first position to the second position, the first main body rotates in unison with the driven element to switch the electrical device from one of the folded state and the unfolded state to the other one of the folded state and the unfolded state, and when the external force on the holding portion is released, the second elastic member exerts resilient force on the adjusting post to make the adjusting post move back from the second position to the first position, and return to the first position, and during and upon completion of the process of the adjusting post returning to the first position, the electrical device remains switched to the other one of the folded state and the unfolded state.

16. The electrical device of claim 13, further comprising a plurality of rails disposed in the housing, wherein at least one protrusion and a contacting member are disposed on a surface of the adjusting post, the at least one protrusion and the contacting member are slidable along the rails, and the one end of the second elastic member is connected to the contacting member of the adjusting post.

* * * * *